US007828367B2

(12) United States Patent
Hickam et al.

(10) Patent No.: US 7,828,367 B2
(45) Date of Patent: Nov. 9, 2010

(54) EXPANDABLE MOBILE FACILITY

(75) Inventors: Michael Lavern Hickam, Sterling, CO (US); Victor Lee Wisdom, Sterling, CO (US); Ivan J. Jaszlics, Golden, CO (US)

(73) Assignee: Pathfinder Systems, Inc., Lakewood, CO (US)

( * ) Notice: Subject to any disclaimer, the term of this patent is extended or adjusted under 35 U.S.C. 154(b) by 183 days.

(21) Appl. No.: 12/182,309

(22) Filed: Jul. 30, 2008

(65) Prior Publication Data

US 2009/0134663 A1 May 28, 2009

Related U.S. Application Data

(60) Provisional application No. 60/952,627, filed on Jul. 30, 2007.

(51) Int. Cl.
*B62D 63/06* (2006.01)
(52) U.S. Cl. .......... 296/156; 296/26.12; 296/26.13; 296/26.14; 296/26.15; 52/69; 52/79.5
(58) Field of Classification Search ............ 296/156, 296/159, 160, 162, 164, 165, 168, 172, 175, 296/176, 24.3, 24.38, 24.33, 26.01, 26.02, 296/26.03, 26.08–26.15; 52/67, 68, 69, 79.5, 52/143; 74/519, 520
See application file for complete search history.

(56) References Cited

U.S. PATENT DOCUMENTS

| | | | | | |
|---|---|---|---|---|---|
| 566,127 | A | * | 8/1896 | Bierstadt | 105/393 |
| 1,156,693 | A | * | 10/1915 | Koger | 296/26.01 |
| 2,155,876 | A | * | 4/1939 | Stout | 52/69 |
| 2,167,557 | A | * | 7/1939 | Stout | 52/69 |
| 3,743,346 | A | * | 7/1973 | Senn et al. | 296/164 |
| 4,114,942 | A | * | 9/1978 | Greiner | 296/172 |
| 4,135,755 | A | * | 1/1979 | Steffens | 296/26.15 |
| 4,489,975 | A | * | 12/1984 | Fredin | 296/186.4 |
| 4,603,518 | A | * | 8/1986 | Fennes | 52/66 |
| 5,417,468 | A | * | 5/1995 | Baumgartner et al. | 296/162 |
| 6,345,471 | B1 | * | 2/2002 | Gyllenhammar | 52/69 |
| 6,729,677 | B2 | * | 5/2004 | Gurdjian et al. | 296/156 |
| 7,021,694 | B1 | * | 4/2006 | Roberts et al. | 296/100.18 |
| 7,178,857 | B2 | * | 2/2007 | Williams | 296/173 |

* cited by examiner

*Primary Examiner*—Glenn Dayoan
*Assistant Examiner*—Pinel E Romain
(74) *Attorney, Agent, or Firm*—Leon S. Erikson

(57) ABSTRACT

A mobile facility has a fixed frame, an expandable roof section, an expandable floor section, and an expandable side section. Interior space within the mobile facility is expanded by expanding the expandable roof section, the expandable floor section and the expandable side section.

20 Claims, 13 Drawing Sheets

EXPANDABLE MOBILE FACILITY

CLAIM OF PRIORITY

This application claims the benefit of U.S. Provisional Application No. 60/952,627, filed Jul. 30, 2007.

FIELD OF THE INVENTION

The present invention relates generally to the field of expandable mobile facilities. More specifically, the present invention involves a new and improved apparatus and method for expanding a mobile facility to provide a large internal enclosed space with a flat floor within the facility.

BACKGROUND AND DESCRIPTION OF RELATED ART

There are many commercial and military uses for a mobile facility which can be transported over public highways without a special permit and which can quickly expand to provide a large enclosed interior space with a flat floor. Some sample uses include use as a military field hospital, for use with commercial exhibitions and demonstrations, and working quarters for a temporary job site.

The width of mobile facilities is generally limited by federal regulations governing maximum vehicle width allowable for transport over the public highways. Special permits can be obtained to legally transport oversized vehicles. These permits can add significant cost to the transportation of the oversized vehicle. It is therefore preferable that a mobile facility be not so large as to require special permits.

In order for a mobile facility to posses a greater interior width and floor area than a standard sized trailer, without requiring a special permit, the mobile facility must have some method of expansion. One way of expanding a mobile facility is through the use of a slide-out. A slide-out is essentially a five sided box which can slide out of one side of a facility from a compact configuration to an expanded configuration thereby expanding the interior space of the facility. Slide-outs are often found in recreational vehicles. A slide-out has several disadvantages when used in a mobile facility.

A single slide-out that expands the width of a mobile facility can only expand the width of the facility by an amount less than the initial width of the facility. This is because the expanded width comprising the sides of the slide-out must be contained within the width of the facility when the slide-out is in the compact configuration. Furthermore, if both sides of the facility have typical slide-outs for expansion, the slide-outs must either each expand the sides of the facility only half as much as the facility is wide or else be of different dimensions from one other, so that one slide-out fits within the other. Slide-outs on either side of a facility which are of different dimensions from one another will also lack symmetry and be less aesthetically pleasing than a symmetrical design.

A facility with a slide-out tends to have uneven flooring when the slide-out is extended. This is because the floor of the slide-out must be higher than the floor of the facility in order for the slide-out to fit within the facility. Uneven flooring tends to limit the practical applications to which such facilities can be put to use. Uneven flooring presents challenges in moving objects within the expanded interior space and requires extra care when stepping across. This can be especially problematic in applications which require limited lighting, such as certain military applications requiring strict light discipline, or in applications which require the moving about of wheeled objects, such as stretchers in a field hospital.

A facility having a double sided slide-out designed for maximum interior space has the additional problem of a lack of accessibility to the interior of the facility for cargo storage or access when the facility is in the compact configuration. The top most floor in the compact configuration of such a facility is likely to be the floor of one of the slide-outs. Besides problems accessing the cargo hold in this compact configuration, the cargo itself would be stored on the floor portion of one of the slide-outs if the cargo hold was even accessible. Storing cargo on the floor portion of a slide-out in a facility such as this in the compact configuration would likely require cargo of significant weight to be removed prior to expanding the slide-out to avoid damaging whatever mechanism expands or contracts the slide-out. If the cargo is such that it is normally positioned and used in the center of the facility, removing the cargo just to allow the expansion of the slide-outs requires extra time and effort compared to a facility which allows cargo to remain in the center of the facility during the expansion process.

Other expandable mobile facilities may comprise independent panels which must be manually fitted to sections of the facility and locked into position. This type of facility could just as easily be made independent of a trailer or vehicle. Such an expandable facility requires significant time and manpower to setup and tear down. The longer it takes to setup and tear down such a facility, the less mobile it truly is.

SUMMARY OF THE INVENTION

The present invention relates to an expandable mobile facility based on a mobile chassis and body having an enclosed interior space. This enclosed interior space is expandable on one or both sides of the facility. The facility is expanded from a compact configuration to an expanded configuration through the expansion of three main expandable sections, which are each separate from one another: an expandable roof, an expandable side, and an expandable floor. The expandable roof pivots outward and up to expand from its compact position. The expandable side remains vertical and moves outward from a compact position to an expanded position. The expandable floor pivots outward and down to expand from its compact position. The interior space of the mobile facility can be contracted by reversing this process.

An expandable mobile facility of the present invention is expanded or contracted in much less time than facilities having a comparable expanded interior space. The facility has a useable interior space or cargo hold while the facility is in the compact configuration. Additionally, any cargo within the interior space of the facility does not interfere with expanding the facility from the compact configuration to the expanded configuration. The facility has a level floor in the expanded configuration which does not interfere with movement of people or things on top of the level floor.

One aspect of the present invention involves an expandable mobile trailer having a compact configuration and an expanded configuration. The trailer includes a fixed frame, an expandable roof section, an expandable side section, and an expandable floor section. The expandable sections have a generally rectangular shape and are each hingeably coupled to the fixed frame. The expandable sections also each have a compact position and an expanded position. Movement of the three expandable sections from the compact positions to the expanded positions transforms the trailer from the compact configuration to the expanded configuration and increases the size of the interior space within the trailer.

Another aspect of the present invention involves a method of expanding an expandable mobile trailer. A fixed roof of the trailer is suspended above a fixed floor of the trailer by a plurality of support members. An expandable roof section is hingeably coupled to the fixed roof of the trailer. The expandable roof section is rotated from a substantially vertical position to a substantially horizontal position. An expandable side section is hingeably coupled to at least two support members and is outwardly moved from a first vertical position relatively close to the support members to a second vertical position relatively far from the support members. An expandable floor section is hingeably coupled to the fixed floor of the trailer. The expandable floor section is rotated from a substantially vertical position to a substantially horizontal position.

Subsidiary aspects of the present invention involve an interior space of an expandable mobile trailer which is used to store cargo in a compact configuration of the trailer, and the cargo does not have to be unloaded when the trailer is expanded to the expanded configuration of the trailer. When the trailer is in the expanded configuration, the top surface of the fixed floor and the top surface of the expandable floor section lie substantially within the same plane.

A more complete appreciation of the present invention and its scope may be obtained from the accompanying drawings, which are briefly summarized below, from the following detailed description of a presently preferred embodiment of the invention, and from the appended claims.

DETAILED DESCRIPTION

Figure 1:
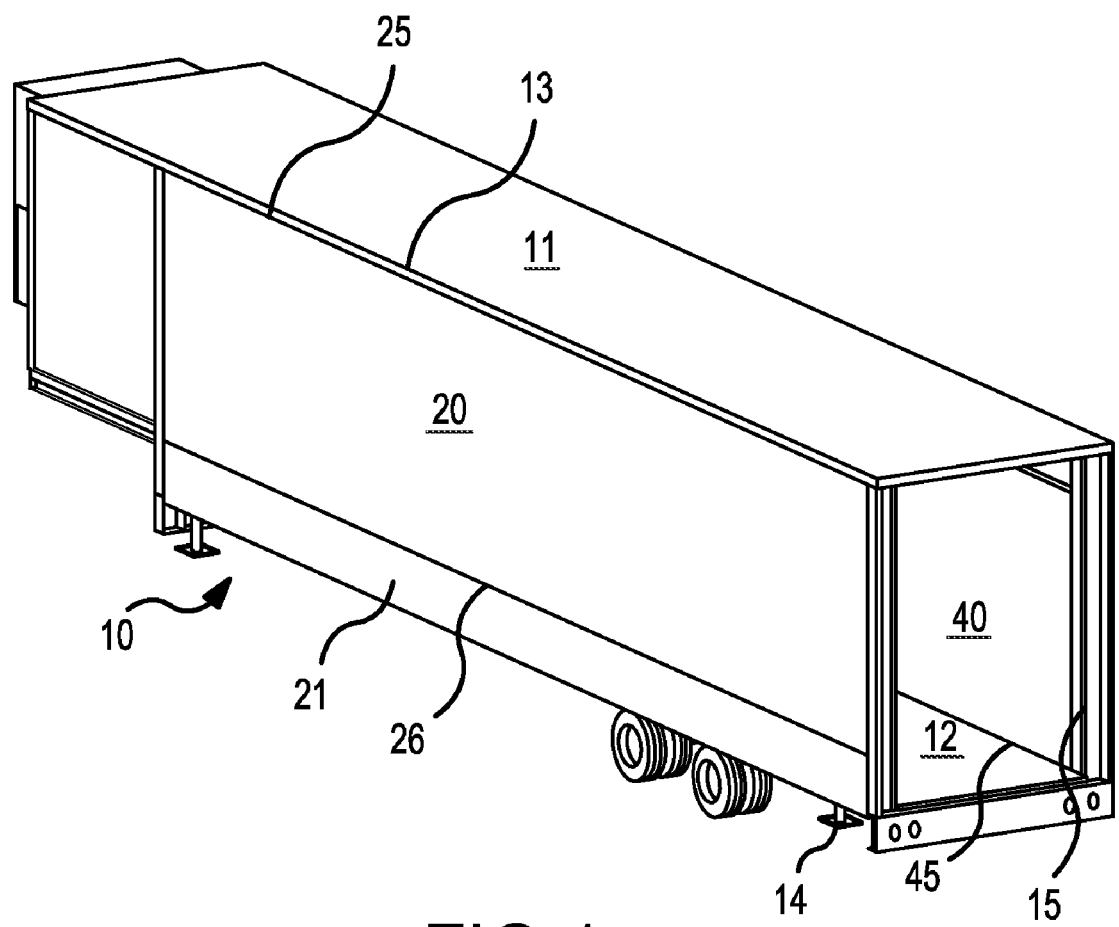
FIG. 1 is a top rear perspective view of an expandable mobile facility in a compact configuration which incorporates the present invention.
Figure 2:
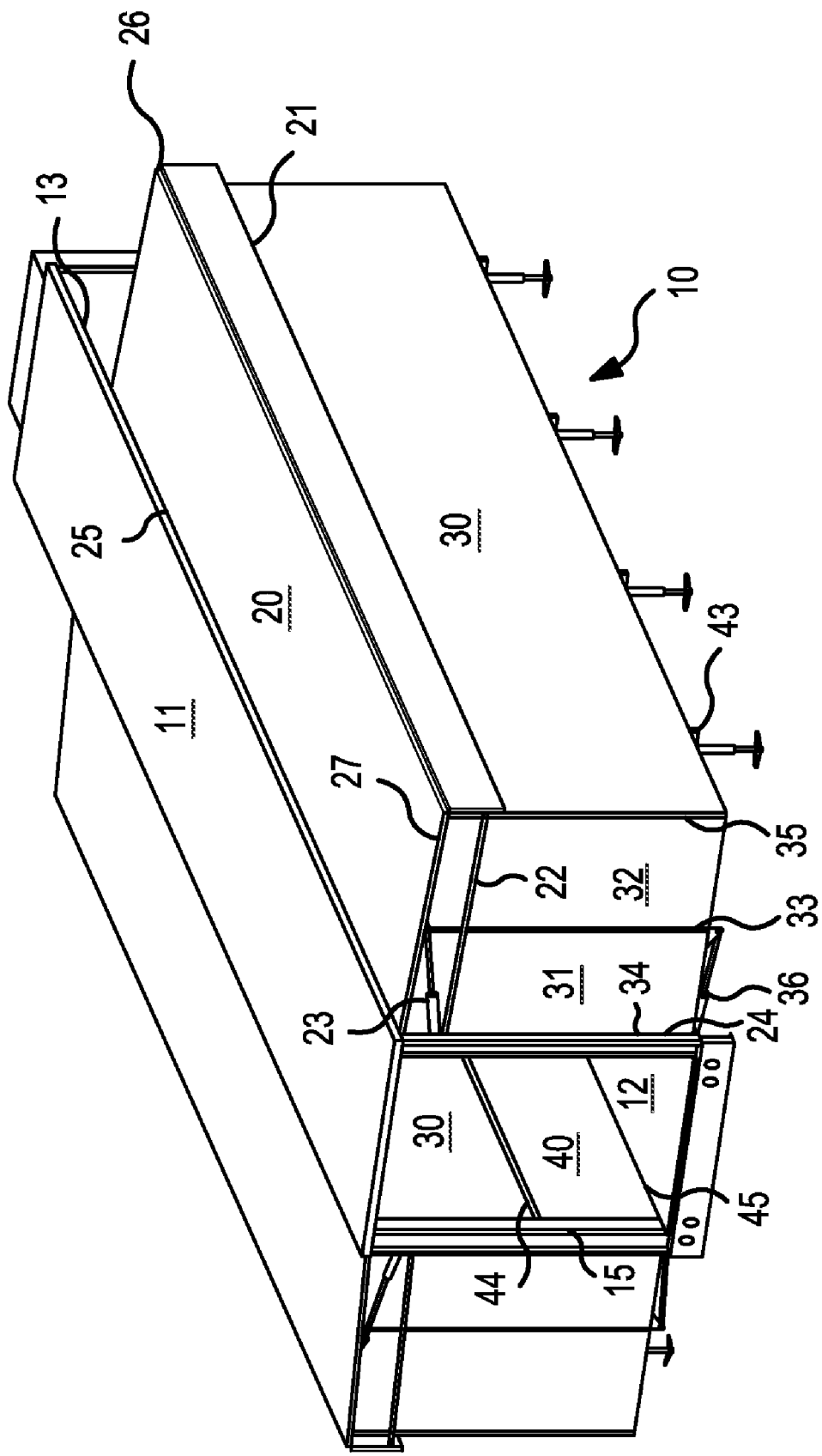
FIG. 2 is a top right perspective view of the expandable mobile facility shown in FIG. 1 in an expanded configuration.

An expandable mobile facility ("facility") 10 which incorporates the present invention is shown in FIGS. 1 and 2. The facility 10 is shown in FIG. 1 in a compact configuration in which the facility 10 is transported over public roads by a tractor unit (not shown). The facility 10 is shown in FIG. 2 in an expanded configuration in which the facility 10 has an expanded interior space. The facility 10 is shown in FIGS. 1 and 2 without a rear section or door to better show the interior of the facility 10.

A fixed roof 11 is supported by pillars 15 at each of four corners of the facility 10. The pillars 15 are further attached to a fixed floor 12. The fixed roof 11 could also be supported by posts or other supportive structures at other locations within the interior of the facility. Supporting the fixed roof 11 with pillars 15 at the four corners of the facility 10 maximizes the useable interior space compared with locating the pillars 15 centrally within the interior space of the facility 10.

The fixed roof 11, the fixed floor 12 and the pillars 15 are part of the structural components of the facility 10 which remain stationary as the facility 10 is expanded from the compact configuration to the expanded configuration or compacted from the expanded configuration to the compact configuration. The facility 10 has three main expandable sections on each side of the facility 10 which expand the interior space of the facility 10 when the expandable sections are each moved from a compact position to an expanded position. These three expandable sections are an expandable roof section 20, an expandable side section 30, and an expandable floor section 40. The three expandable sections each have a compact position and an expanded position. The process of expanding the facility 10 from the compact configuration is referred to as an expansion process and involves moving the expandable sections from the compact positions to the expanded positions. The process of compacting the facility 10 from the expanded configuration is referred to as a compaction process and involves moving the expandable sections from the expanded positions to the compact positions.

The expandable roof section 20 is normally the first of three expandable sections to be expanded during the expansion process of the facility 10 and the last to be compacted during the compaction process of the facility 10. The expandable roof section 20 is shown in FIG. 1 in the compact position. The expandable roof section 20 is vertical and is the exterior sidewall of the facility 10 when the expandable roof section 20 is in the compact position. The expandable roof section 20 is shown in the expanded position in FIG. 2. The expandable roof section 20 is hingeably attached at 25 to a side 13 of the fixed roof 11 which allows the expandable roof section 20 to swing out and up from its compact position into its expanded position. A flap 21 is hingeably attached at 26 to the expandable roof section 20. The flap 21 is pivotally attached to one end of a stabilizer bar 22. The other end of the stabilizer bar 22 is pivotally attached to one of the pillars 15 within a recessed area 24. An expandable roof actuator 23 is pivotally attached at one end to the pillar 15 within the recessed area 24 and at the other end to the expandable roof section 20. In the expanded configuration, the expandable roof section 20 and flap 21 hang over accordion panels 31 and 32 several inches to allow mounting areas for the stabilizer bar 22 and roof actuator 23. This expandable roof overhang 27 is more clearly shown in FIG. 3.

There is on each end (the front and rear ends) of the expandable roof section 20: a roof actuator 23, a stabilizer bar 22, and a recessed area 24 of a pillar 15. The expandable roof section 20 swings out and up from its compact position and becomes the roof for the expanded portion of the side of the facility 10 it is on. The roof actuators 23 supply the force necessary to lift the expandable roof section 20 into the expanded position from the compact position. The roof actuators 23 travel in a vertical plane which is substantially perpendicular to the side of the facility 10.

Figure 3:
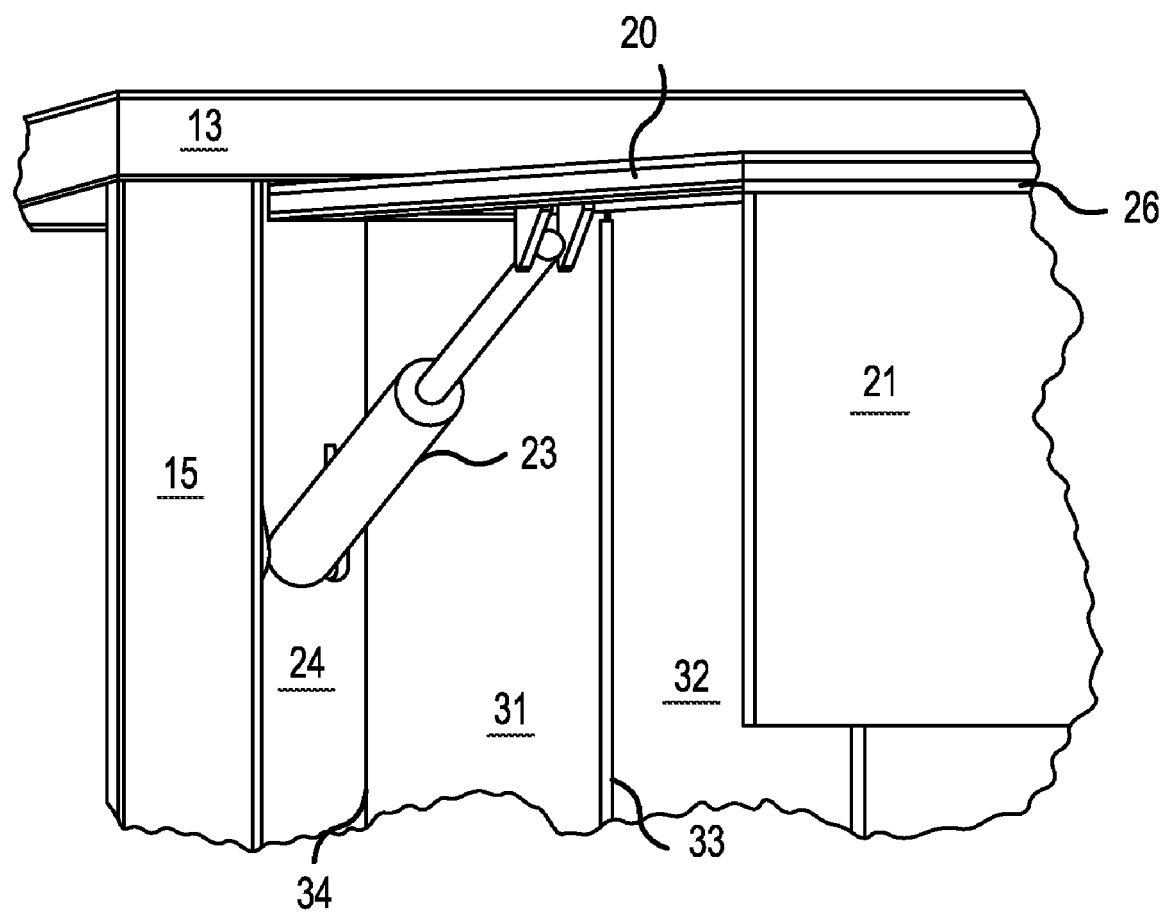
FIG. 3 is a perspective view of a recessed area and roof actuator of the facility shown in FIG. 1.

The recessed area 24 is more clearly shown in FIG. 3. The recessed area 24 is defined by a planar surface which faces away from the interior of the facility 10 and which is recessed interiorly with respect to the most exterior surface of the pillar 15 and extends to inner accordion hinge 34. The recessed area 24 is large enough to contain the roof actuator 23 and the stabilizer bar 22 (not shown in FIG. 3) when the expandable roof section 20 is in the compact position. As shown in FIGS. 1 and 2, the flap 21 is secured by the expandable roof flap stabilizer bar 22. The flap 21 adds structural rigidity to the expandable roof section 20 when the expandable roof section 20 is in the expanded position.

In its expanded position, the expandable roof section 20 rests on top of the expanded expandable side section 30. To allow the expandable side section 30 to expand to its expanded position, the expandable roof section 20 is raised slightly higher than it rests in its final expanded configuration so that the expandable roof section 20 doesn't interfere with the movement of the expandable side section 30. Once the expandable side section 30 is fully expanded, the expandable roof section 20 lowers on top of the expandable side section 30.

The expandable side section or wall 30 is normally the second of the three expandable sections to be deployed during the expansion process and is also the second of the three expandable sections to be compacted during the compaction process. Both front and rear ends of the expandable side section 30 (FIG. 2) are hingeably attached to a different outer accordion panel 32 at an outer accordion hinge 35. The outer accordion panel 32 is hingeably attached to an inner accordion panel 31 at a center accordion hinge 33. The inner accordion panel 31 is hingeably attached to the recessed area 24 at an inner accordion hinge 34. The expandable side section 30 maintains a vertical orientation as it travels outward from the facility 10 as the expandable side section 30 is moved from the compact position to the expanded position. The inner accordion panel 31' and the outer accordion panel 32' are shown in the compact configuration in FIG. 4. In the compact configuration, these two panels are substantially parallel to each other and assume a face to face orientation. Two structural I-beams 16 extend along the length of the facility 10 and strengthen the fixed floor 12. A side actuator 36 is shown with one end attached to an I-beam and the other end to the bottom of inner accordion panel 31, near the center accordion hinge 33. Side actuator 36 travels in a substantially horizontal plane and causes the inner accordion panel 31 to move between its compact position, substantially parallel with the fixed side 13, and its expanded position, substantially perpendicular to the fixed side 13. On each of the front and rear ends of the expandable side section 30 there are: an inner accordion panel 31, an outer accordion panel 32, an inner accordion hinge 34, a center accordion hinge 33, an outer accordion hinge 35, and a side actuator 36.

Figure 5:
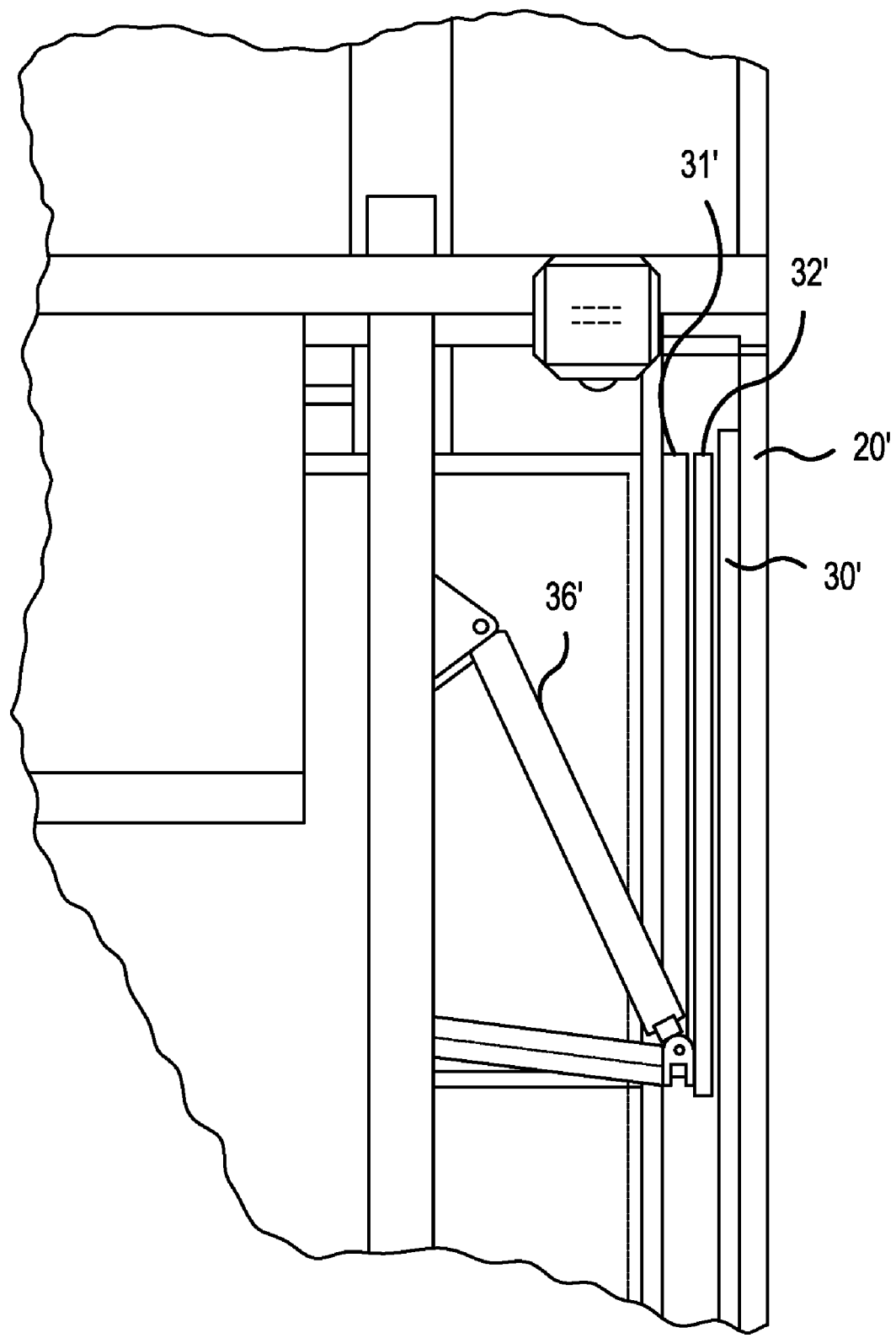
FIG. 5 is a close up plan view of a portion of FIG. 4 showing a side actuator and accordion panels.

The positioning and relationships of the accordion panels 31' and 32', the expandable side section 30', the side actuator 36', and the expandable roof section 20' in the compact configuration are more clearly shown in FIG. 5. The expandable sections use very little of the interior space within the facility 10 when the facility 10 is in the compact configuration. The accordion panels 31' and 32' and each of the expandable sections are roughly two inches thick. There are five expandable panels stacked next to each other on both sides of the facility 10 when the facility 10 is in the compact configuration. These five panels are, from innermost to outermost: the expandable floor section 40, the inner accordion panel 31, the outer accordion panel 32, the expandable side section 30, and the expandable roof section 20. Together, these five panels take up about less than a foot of sideways space in an embodiment of the facility 10 where the panels are two inches thick. Assuming a facility 10 with the maximum standard width of one hundred and two inches (to allow for travel on public highways without a wide-load permit) and expandable on both sides, the interior space available for cargo in the compact configuration is around eighty inches. This interior cargo width could be more or less depending upon the thickness of the expandable panels.

The expandable side section 30 is expanded after the expandable roof section 20 has been extended to its most expanded position. To expand the expandable side section 30, the side actuators 36 are activated to exert pressure on the ends of the inner accordion panels 31, causing the inner accordion panels 31 to swing out on the inner accordion hinges 34. This action causes the outer accordion panels 32 to also swing out since they are hingeably attached to the inner accordion panels 31 on one side and hingeably attached to the expandable side section 30 on the other. As the accordion panels 31 and 32 swing out to their fully expanded position the expandable side section 30 also moves outward away from the fixed wall to its expanded position.

Depending on how heavy the expandable side section 30 and the accordion panels 31 and 32 are and on how structurally strong the hinge areas 33 and 35 are, it may be desirable to support the expandable side section 30 with wheeled dollies during the expansion process. It may also be desirable to have some kind of support for the expandable side section 30, such as retractable or independent legs, to bear the weight of the expandable side section 30 in the expanded position.

The expandable floor section 40 is normally the last of the three expandable sections to be deployed in the expansion process and the first to be contracted in the contraction process. The expandable floor section 40 is shown in the expanded position in FIG. 2. The expandable floor section 40 is hingeably attached at 45 to the fixed floor 12. There is some clearance (around half an inch in this embodiment of the facility) between the expandable floor section 40 and the expandable side section 30 and accordion panels 31 and 32 in the expanded positions to allow the expandable floor section 40 to expand into its expanded position without any interference. A floor end piece 44 helps seal any gaps between the expandable floor section 40 and the expandable side section 30 and accordion panels 31 and 32. The floor end piece 44 is a flexible material, such as a plastic strip, and is attached to the expandable floor section 40 along the edges of the expandable floor section 40 other than the edge by which the expandable floor section 40 is hingeably attached to the fixed floor 12. The expandable floor section 40 is shown in the compact position in FIG. 1. The expandable floor section 40 constitutes part of the interior sidewall of the facility 10 when the facility 10 is in the compact configuration.

Figure 4:
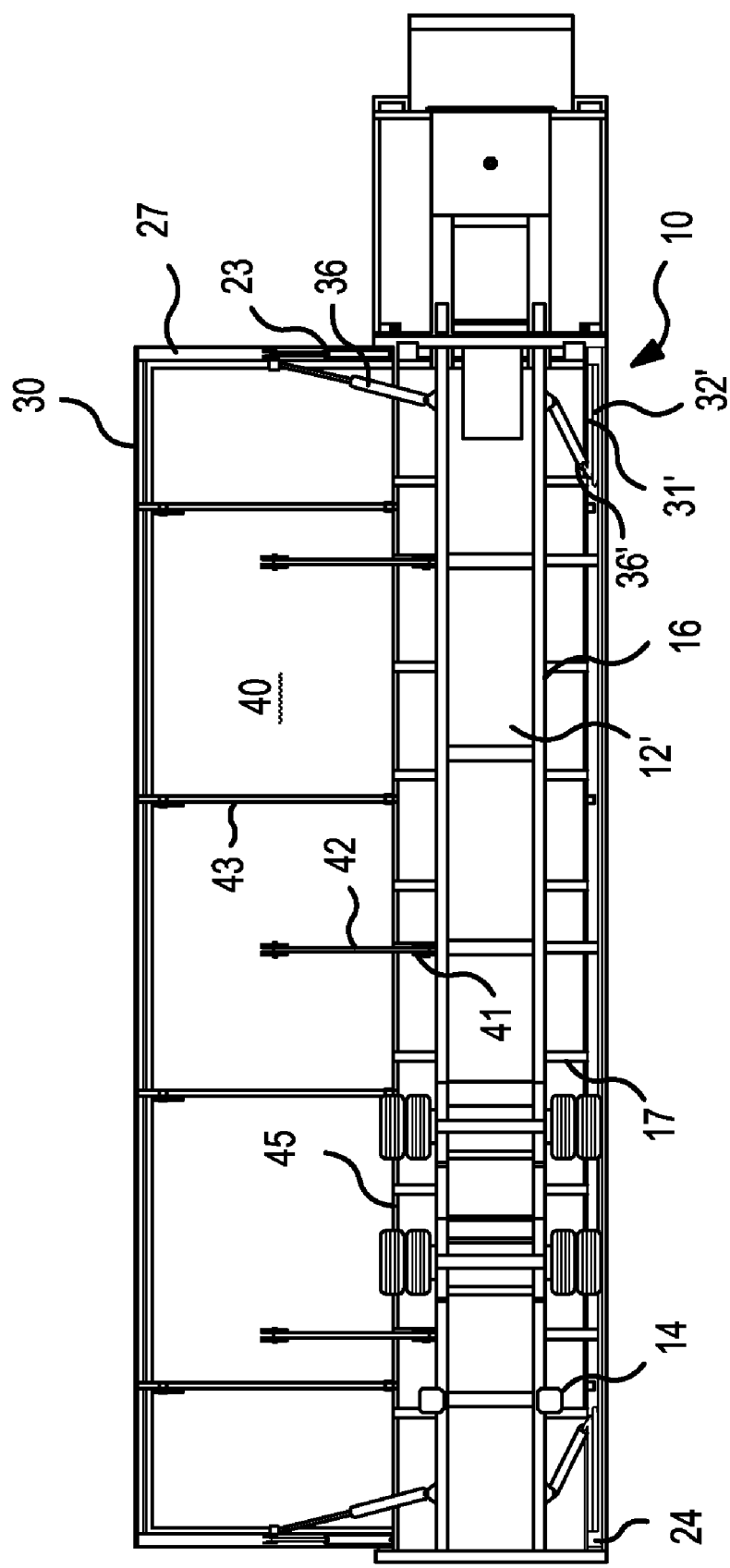
FIG. 4 is a bottom plan view of the facility shown in FIG. 1 with one side of the facility expanded and one side compacted.

The expandable mobile facility 10 has three floor actuators 41 which raise and lower the expandable floor section 40, as shown in FIG. 4. The floor actuators 41 are pivotally connected to one end of the long actuator extension arms 42. The other end of the long actuator extension arms 42 are pivotally connected to the expandable floor section 40. The floor actuators 41 are in the fully extended position when the expandable floor section 40 is in the compact position. The floor actuators 41 are in the contracted position when the expandable floor section 40 is in the expanded position, as shown in FIG. 6.

Figure 6:
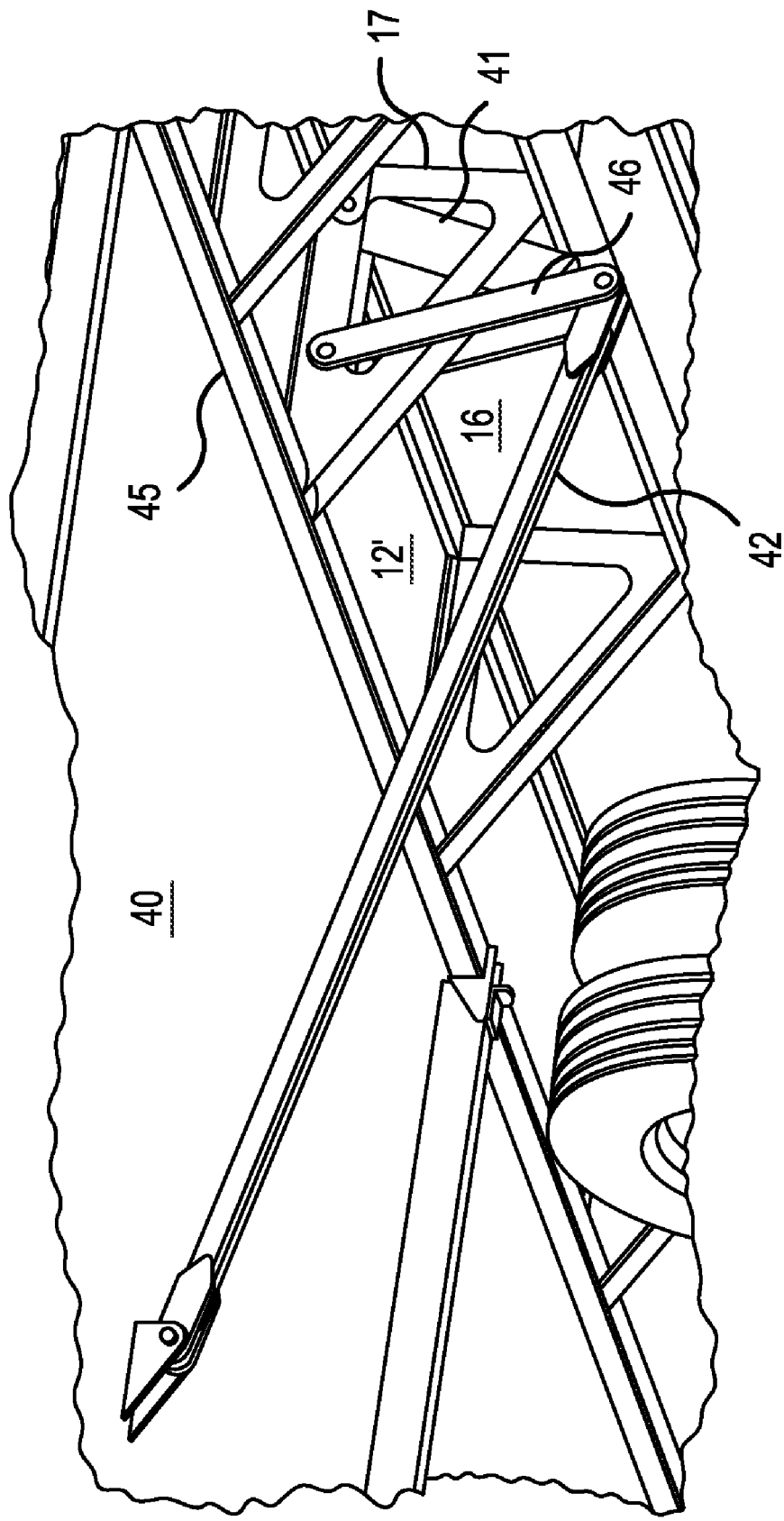
FIG. 6 is perspective view of a floor actuator and related components of the facility shown in FIG. 1.

FIG. 6 shows a more detailed view of a floor actuator 41 and related components. Floor actuator 41 is shown contained within two triangular supports 17 and is pivotally attached to the two triangular supports 17 that contain it. The triangular supports 17 are connected to the I-beam 16 and the underside of the fixed floor 12'. The short actuator extension arm 46 is a two-piece lever which is pivotally connected to the top portion of the triangular support 17 and also pivotally connected to the floor actuator 41. When the floor actuator 41 is expanded from its contracted position, it exerts force on the bottom end of the short actuator extension arm 46, causing the short actuator extension arm 46 to rotate about its top pivot point, which causes the force from the floor actuator 41 to be transferred to the long actuator extension arm 42, which in turn causes the expandable floor section 40 to raise from the expanded position to the compact position. To move the expandable floor 40 from the compact position to the expanded position, the floor actuator 41 retracts from its expanded position exerting a pulling force on the long actuator extension arm 42.

Figure 7:
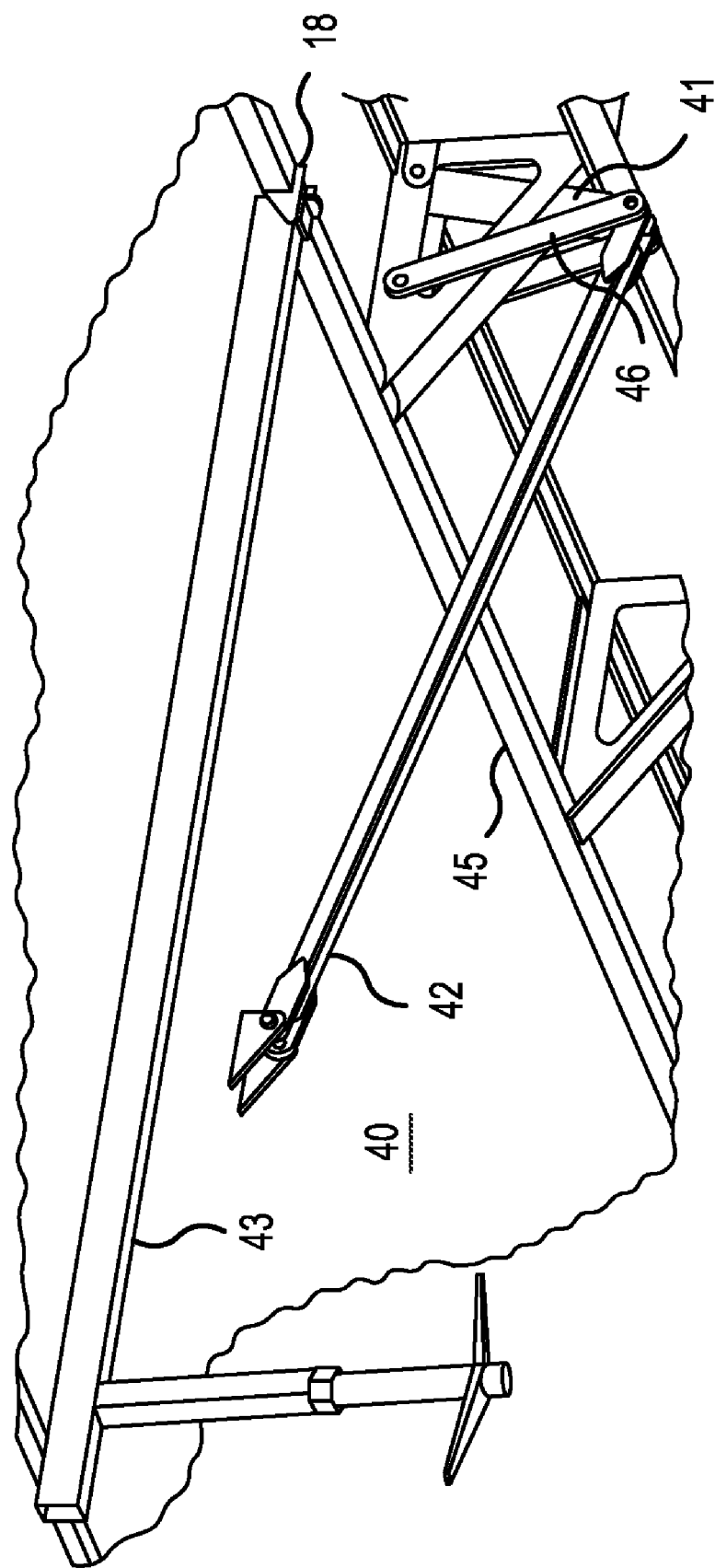
FIG. 7 is a perspective view of an outrigger attached to the facility shown in FIG. 1.
Figure 8:
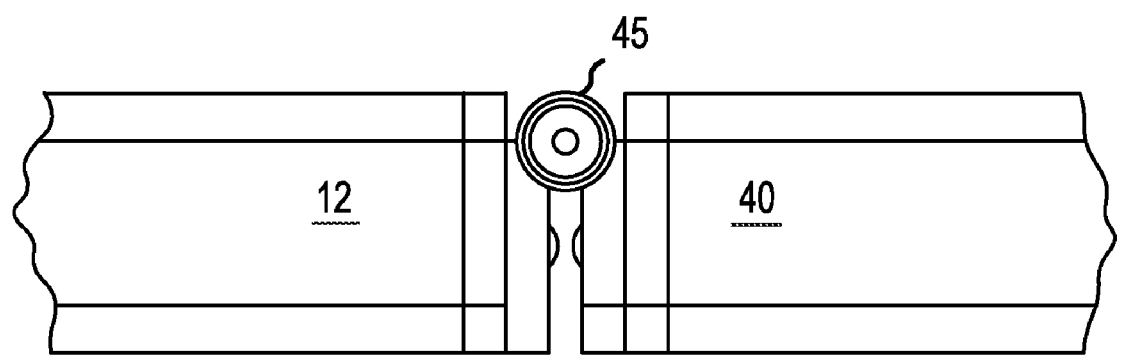
FIG. 8 is a cross-sectional view detailing a floor hinge between a fixed floor and an expandable floor section of the facility shown in FIG. 1.
Figure 9:
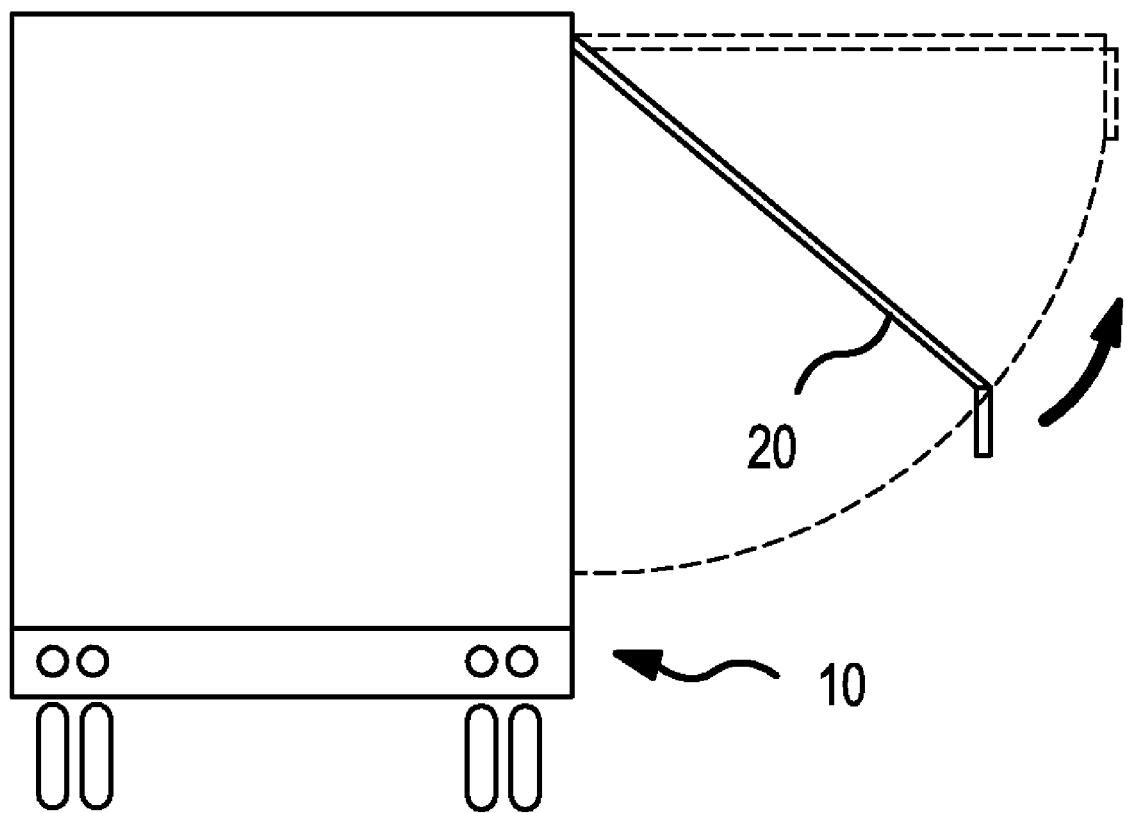
FIG. 9 is a rear plan view of the expansion of an expandable roof of the facility shown in FIG. 1.
Figure 10:
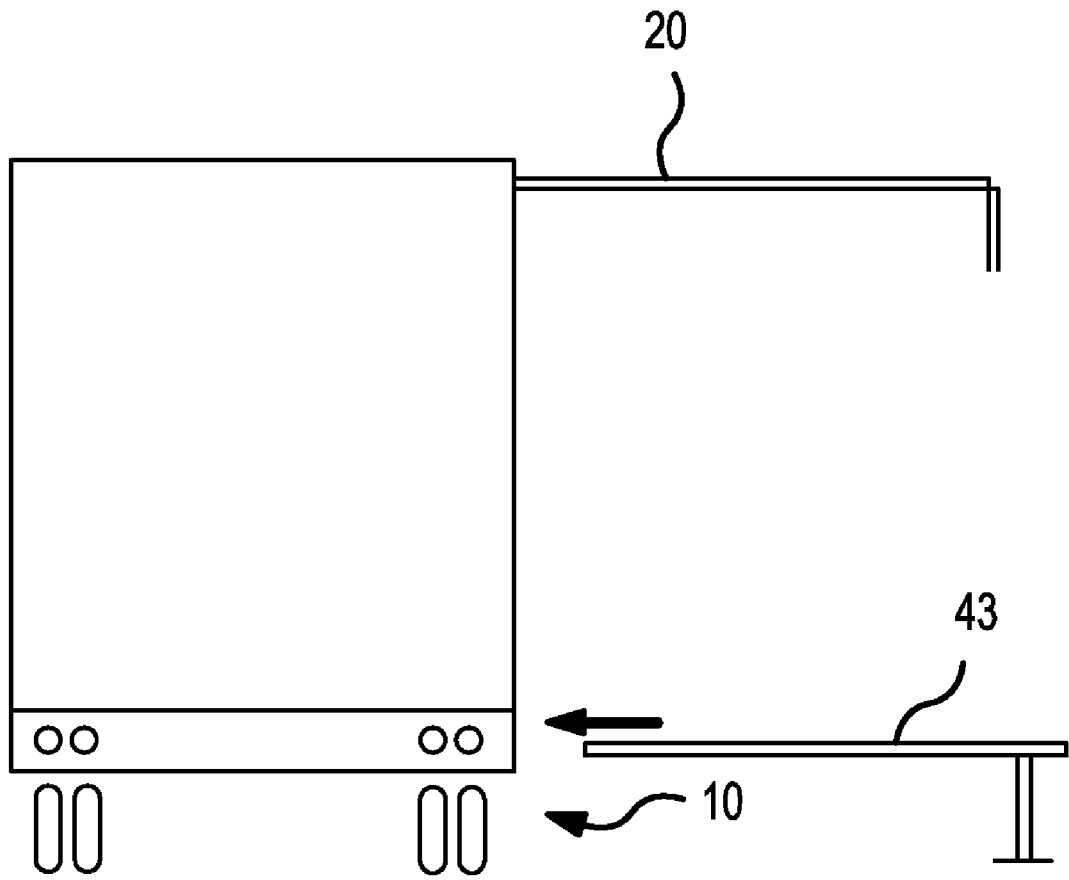
FIG. 10 is a rear plan view of an outrigger being attached to the facility shown in FIG. 1.
Figure 11:
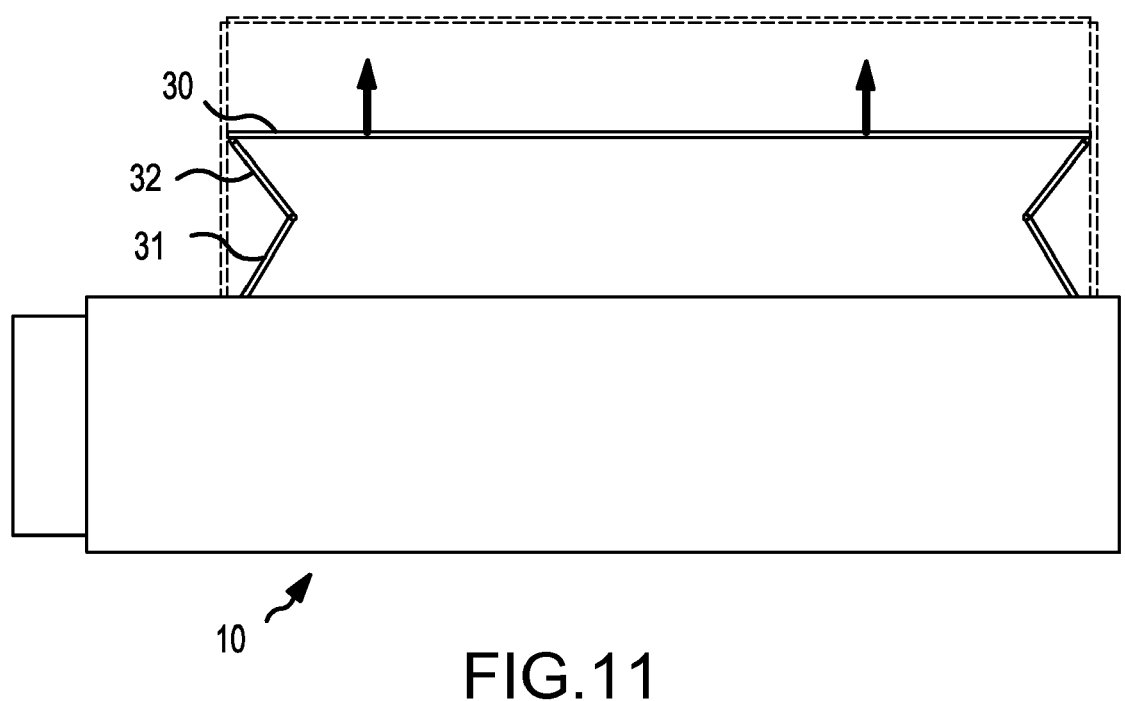
FIG. 11 is a top plan view of the process of expanding an expandable side section of the facility shown in FIG. 1.
Figure 12:
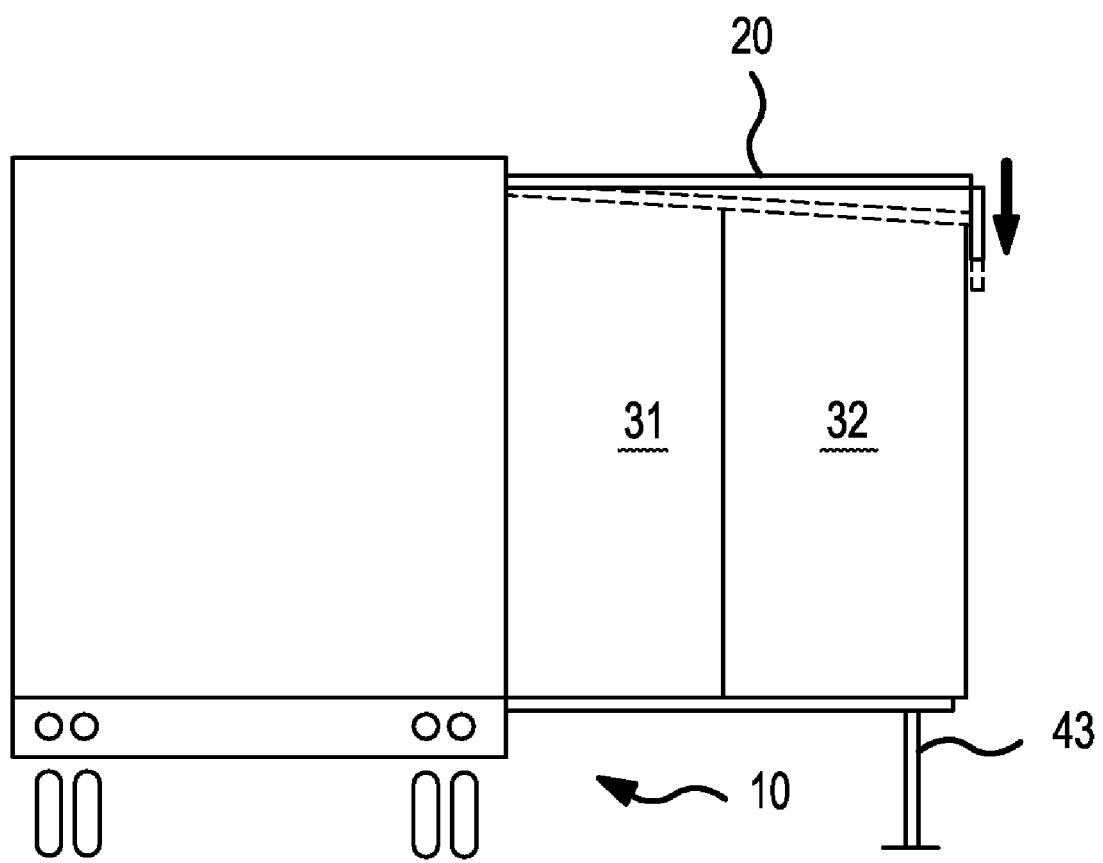
FIG. 12 is a rear plan view of the process of lowering the expandable roof section onto the expandable side section shown in FIG. 11.
Figure 13:
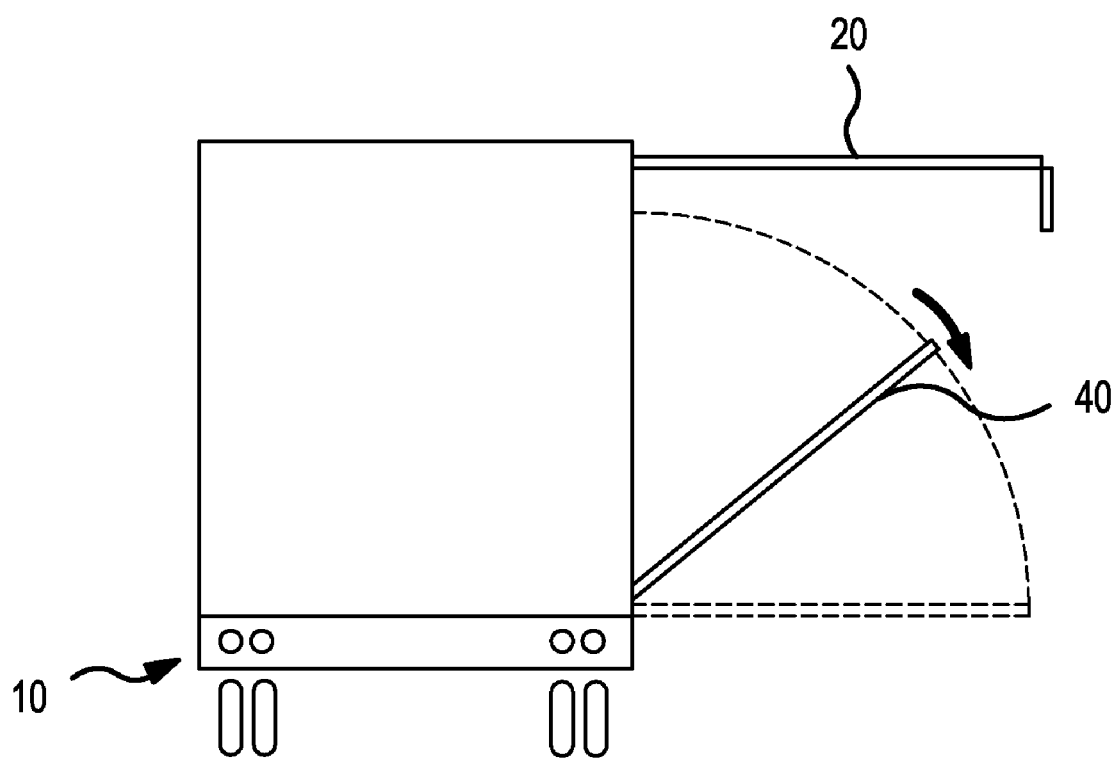
FIG. 13 is a rear plan view of the process of lowering an expandable floor section of the facility shown in FIG. 1.

FIG. 4 shows outriggers 43 which are used to provide support for the expandable floor section 40. The outriggers 43 are not necessarily required in all embodiments of the facility 10. Whether or not the outriggers 43 are needed depends on the structural strength of the expandable floor section 40 and related support mechanisms. One advantage to using the outriggers 43 described in this embodiment is that the expandable floor section 40 does not need to be as structurally strong as it would need to be if the expandable floor section 40 were not supported by an external support system like the outriggers 43. The outrigger 43 is shown in more detail in FIG. 7. The outrigger 43 comprises a long arm which supports the expandable floor section 40, one end of which is connected to an outrigger receiver 18 built into the underside of the fixed floor 12' and the other end to which a short adjustable leg is attached which connects the outer end to the ground. One of the advantages of the present invention is that the interior floor in the expanded configuration, which comprises the fixed floor 12 and the expandable floor section 40, is substantially flat and does not have a step as does a slide-out. FIG. 8 shows a cross-sectional view of a floor hinge area, the floor hinge 45 which connects the expandable floor section 40 to the fixed floor 12. It should be appreciated that the hinge in the shown embodiment is recessed within the floor so as not to protrude above the top surface of the combined floor when the expandable floor section 40 is in its expanded position The process of expanding the expandable mobile facility 10 from the compact configuration to the expanded configuration is described below with reference to FIGS. 9-13. The expandable roof section 20 is the first of the three expandable sections to be expanded, as shown in FIG. 9. Next, the outriggers 43 are attached to the facility 10 as shown in FIG. 10. The expandable side section 30 is then expanded as shown in FIG. 11. After the expandable side section 30 has been expanded, the expandable roof 20 is lowered on top of the expanded expandable side section 30, as shown in FIG. 12. Lastly, the expandable floor section 40 is expanded within the expanded expandable side section 30, as shown in FIG. 13 (expandable side section 30 not shown for clarity).

The shown embodiment of the expandable mobile facility includes four leveling legs 14 (FIG. 4), spaced at each corner of the facility which can each be expanded independently to level the facility. Other embodiments of the expandable mobile facility may not have leveling legs.

The described embodiment of the facility uses actuators to provide the force necessary to expand and compact the expandable sections. Other means of moving the expansive structures could be used in place of the described actuators. The described actuators could also be in different locations with different mounting points than those shown and described. One of the benefits of having the actuators in the shown and described positions is that they are all visible from the exterior of the facility to allow for easy inspection or replacement when the expansive structures are in their expanded positions. The preferred embodiment of the facility uses hydraulic actuators which are controllable by a plug-in controller or panel from a central location on the exterior of the facility which is not in the path of any of the expandable structures.

Although the described embodiment of the facility uses the expandable roof section as the exterior sidewall when the facility is in the compact configuration, it should be appreciated that the present invention also includes embodiments in which the exterior sidewall in the compact configuration is a different panel, such as the expandable floor or expandable sidewall. The shown embodiment has the advantage of better protecting the expanded interior from rainfall since the expandable roof section completely covers and slightly overhangs (with the flap) the expandable sidewall and accordion panels.

It should be understood that the present invention includes embodiments in which only one side of the facility is expandable as well as those in which multiple sides are expandable.

Although the described embodiment uses two accordion panels to support and connect the expandable side section to the fixed frame, other embodiments may replace the two accordion panels with a single panel, hingeably attached at either the fixed side or expandable side, and attached at the opposite side by some means to allow that end to slide along the length of the facility.

In addition, it should be understood that the sequence of steps in expanding or contracting the expandable sections, as discussed above, could be reordered to meet specific requirements of a particular mobile facility.

The preferred embodiment of the present invention is in the form of a towable trailer that is expandable on both sides. The present invention could also be incorporated into a motorized front end, but this may be less preferable to a trailer configuration due to the increased cost and decreased flexibility of transportation options.

A presently preferred embodiment of the present invention and many of its improvements have been described with a degree of particularity. This description is a preferred example of implementing the invention, and is not necessarily intended to limit the scope of the invention. The scope of the invention is defined by the following claims.

What is claimed:

1. An expandable mobile trailer having a mobile compact configuration and a stationary expanded configuration, comprising:

a fixed frame, the fixed frame comprising a fixed floor having a top surface and a bottom surface, a fixed roof and a plurality of substantially vertical support members, the support members supporting the fixed roof above the fixed floor;

an expandable roof section of the fixed roof, the expandable roof section having a generally rectangular shape defined by two short sides and two long sides, the expandable roof section hingeably coupled to the fixed roof along one of the long sides to move between a compact position in which the expandable roof section is substantially vertical and an expanded position in which the expandable roof section is substantially horizontal;

an expandable floor section of the fixed floor, the expandable floor section having a generally rectangular shape defined by two short sides and two long sides, the expandable floor section hingeably coupled to the fixed floor along one of the long sides to move between a compact position in which the expandable floor section is substantially vertical and an expanded position in which the expandable floor section is substantially horizontal;

an expandable side section of the fixed frame, the expandable side section having a generally rectangular shape defined by two short sides and two long sides, the expandable side section hingeably coupled to at least two of the support members along the short sides to move between a compact position in which the expandable side section is substantially vertical and spaced relatively closer to the support members and an expanded position in which the expandable side section is substantially vertical and spaced relatively further from the support members;

a relatively short actuator arm having a first end and a second end, the first end of the relatively short actuator arm pivotally attached to the bottom surface of the fixed floor;

a relatively long actuator arm having a first end and a second end, the first end of the relatively long actuator arm pivotally attached to the second end of the relatively short actuator arm, the second end of the relatively long actuator arm pivotally attached to the expandable floor section;

a floor actuator pivotally attached to both the bottom surface of the fixed floor and the second end of the relatively short actuator arm, the floor actuator operative to expand and contract;

wherein the expansion and contraction of the floor actuator causes the second end of the relatively short actuator arm to pivot about the first end of the relatively short actuator arm, the rotation of the second end of the relatively short actuator arm transmitting force through the relatively long actuator arm to the expandable floor section to move the expandable floor section between the compact and expanded positions; and wherein the trailer has an interior space which is defined by the fixed floor, the fixed roof and the expandable sections, the interior space being larger in the expanded configuration than in the compact configuration; the expandable roof section, the expandable side section and the expandable floor section are in the compact position when the trailer is in the compact configuration and are in the expanded position when the trailer is in the expanded configuration.

2. An expandable mobile trailer as defined in claim 1, wherein the aforementioned expandable sections are a first set of expandable sections hingeably coupled on a first side of the trailer, further comprising:

a second set of expandable sections having similar structure to the first set of expandable sections and hingeably coupled to the trailer on a second side of the trailer in a manner similar to the coupling of the first set of expandable sections.

3. An expandable mobile trailer as defined in claim 2, wherein the width of the trailer in the compact configuration is equal to or less than the maximum width allowable for a trailer driven on public highways without a special permit, and cargo placed on an extent of the fixed floor within the interior space of the trailer when the trailer is in the compact configuration does not interfere with the movement of the expandable sections when the trailer is expanded from the compact configuration to the expanded configuration.

4. An expandable mobile trailer as defined in claim 1, wherein the fixed floor has a top surface and the expandable floor section in the expanded position also has a top surface, and the top surface of the fixed floor and the top surface of the expandable floor section lie substantially within the same plane when the expandable floor section is in the expanded position.

5. An expandable mobile trailer as defined in claim 1, additionally comprising:

two pairs of panels, each panel within each pair hingeably attached to the other panel of the pair, one of the pairs of panels hingeably attached to the expandable side section at a front end of the expandable side section and the other of the pairs of panels hingeably attached to the expandable side section at a rear end of the expandable side section, a separate support member hingeably attached to each pair of panels, and wherein the pair of panels hingeably attached to the front and rear ends of the expandable side section fold towards one another accordion-like as the expandable side section is moved from the expanded position to the compact position.

6. An expandable mobile trailer as defined in claim 5, additionally comprising:

at least two side actuators hingeably coupled to the fixed frame, each of the side actuators further hingeably coupled to a different one of the two pairs of panels, each side actuator expanding or contracting to move the pair of panels to which the side actuator is coupled to between a parallel relationship in which the panels lie side to side substantially within the same plane and a folded accordion-like relationship, which in turn moves the expandable side section between the compact and expanded positions of the expandable side section.

7. An expandable mobile trailer as defined in claim 1, additionally comprising:

a flap hingeably coupled to the long side of the expandable roof section opposite of the long side of the expandable roof section which is hingeably coupled to the fixed roof; and at least one stabilizer bar pivotally attached to the fixed frame and the flap which causes the flap to remain substantially vertical as the expandable roof section is moved between the compact and expanded positions.

8. An expandable mobile trailer as defined in claim 7, wherein the expandable floor section, the expandable side section and the expandable roof section are expandable sections, the expandable floor section in the compact configuration of the trailer constitutes the expandable section closest to the interior space, the expandable roof section constitutes in the compact configuration of the trailer constitutes the expandable section furthest from the interior space, and the expandable side section in the compact position is positioned between the expandable floor section and the expandable roof section in the compact configuration of the trailer.

9. An expandable mobile trailer as defined in claim 1, wherein at least one of the support members includes an exterior planar surface which faces away from the interior of the trailer and is substantially parallel to the expandable roof section when the expandable roof section is in the compact position; the at least one support member includes a recessed planar surface which faces away from the interior of the trailer, is substantially parallel to the exterior planar surface, and is displaced towards the interior of the trailer relative to the exterior planar surface, and further comprising at least one roof actuator hingeably coupled to the recessed planar surface and extending to the expandable roof section, the at least one roof actuator operative to move the expandable roof between the compact and expanded positions of the expandable roof.

10. An expandable mobile trailer as defined in claim 1, further comprising:
a flexible strip attached to one of the expandable side section or the long side of the expandable floor section opposite the long side of the expandable floor section which is hingeably coupled to the fixed floor, the flexible strip contacting the other one of the expandable floor section or the expandable side section when the trailer is in the expanded configuration.

11. A method of expanding an expandable mobile trailer; the trailer having a fixed roof separated from a fixed floor by a plurality of substantially vertical support members; an expandable roof section, an expandable side section and an expandable floor section all having a generally rectangular shape having two short sides and two long sides; the expandable roof section hingeably coupled to the fixed roof along one of the long sides of the expandable roof section, an expandable floor section hingeably coupled to the fixed floor along one of the long sides of the expandable floor section, and an expandable side section hingeably coupled to at least two of the support members along the short sides of the expandable side section, the method comprising:
rotating the expandable roof section from a substantially vertical position to a substantially horizontal position about the long side of the expandable roof section which is hingeably coupled to the fixed roof;
outwardly moving the expandable side section from a first vertical position relatively close to the support members to a second vertical position relatively far from the support members while maintaining the expandable side section in a vertical orientation; and
rotating the expandable floor section from a substantially vertical position to a substantially horizontal position about the long end of the expandable floor section which is hingeably coupled to the fixed floor.

12. A method as defined in claim 11, wherein two pairs of hingeably attached generally rectangular panels hingeably couple the expandable side section to the support members, one pair of each of the hingeably attached panels hingeably coupled to each short side of the expandable side section, each of the panels within each pair of hingeably attached panels in a first position is folded towards the other panel of the same pair face to face when the expandable side section is in the first vertical position and each of the panels within each pair of hingeably attached panels in a second position is oriented side to side in substantially the same plane with the other panel of the same pair when the expandable side section is in the second vertical position, the method further comprising:
outwardly moving the expandable side section from a first vertical position relatively close to the support members to a second vertical position relatively far from the support members by moving the two pairs of hingeably attached panels from the first position of the hingeably attached panels to the second position of the hingeably attached panels.

13. A method as defined in claim 12, further comprising:
rotating the expandable floor section from a substantially vertical position to a substantially horizontal position about the long end of the expandable floor section which is hingeably coupled to the fixed floor to create a combined floor comprising the fixed floor and the expandable floor section in which the top surfaces of the fixed floor and the expandable floor section lie in substantially the same plane.

14. A method as defined in claim 13, further comprising:
attaching outriggers to the trailer which contact the ground and support the weight of the expandable floor section when the expandable floor section is in the substantially horizontal position; and
supporting the weight of the expandable floor section by the outriggers when the expandable floor section is in the substantially horizontal position.

15. A method as defined in claim 12, further comprising:
rotating the expandable roof section from a substantially vertical position to a substantially horizontal position about the long side of the expandable roof section which is hingeably coupled to the fixed roof high enough so that the expandable side section is movable from the first vertical position to the second vertical position without interference from the expandable roof section; and
lowering the expandable roof section from the substantially horizontal position to contact the expandable side section when the expandable side section is in the second vertical position.

16. A method as defined in claim 12, wherein a fixed frame of the trailer comprises the fixed floor, the support members and the fixed roof, and a plurality of roof actuators are pivotally coupled to the fixed frame and the expandable roof section, a plurality of side actuators are pivotally coupled to the fixed frame and the pairs of hingeably attached panels, and a plurality of floor actuators are pivotally coupled to the fixed frame and the expandable floor section, the method further comprising:
rotating the expandable roof section from a substantially vertical position to a substantially horizontal position about the long side of the expandable roof section which is hingeably coupled to the fixed roof by expanding the roof actuators;
outwardly moving the expandable side section from a first vertical position relatively close to the support members to a second vertical position relatively far from the support members by moving the two pairs of hingeably attached panels from the first position in which the panels of each of the pairs of hingeably attached panels are folded towards one another face to face to the second position in which both of the panels within each of the pairs of hingeably attached panels is oriented in substantially the same plane side to side by expanding the side actuators; and
rotating the expandable floor section from a substantially vertical position to a substantially horizontal position about the long end of the expandable floor section which is hingeably coupled to the fixed floor by contracting the floor actuators.

17. An expandable trailer defined by a fixed floor, a fixed roof located above the fixed floor and a plurality of support members separating the fixed floor and the fixed roof, comprising:
an expandable roof section pivotally connected with respect to the fixed roof and moveable to cover a substantial portion of one side when pivoted into a compact position and to extend horizontally from the fixed roof section above the one side when pivoted into an expanded position;
an expandable floor section pivotally connected with respect to the fixed floor and moveable to cover a substantial portion of the one side when pivoted into a compact position and to extend horizontally from the fixed floor section below the one side when pivoted into an expanded position; and an expandable wall section covering the one side and moveably connected to extend between the fixed floor and the fixed roof in a compact position and connected to move horizontally relative to the fixed floor and fixed roof while maintaining a vertical orientation to an expanded position in which the expandable wall section is adjacent to outside portions of the expandable roof and floor sections when in their expanded positions.

18. An expandable trailer as defined in claim 17, wherein the expandable sections fold adjacent to one another in their compact positions.

19. An expandable trailer as defined in claim 17, further comprising:
   a first pair of hingeably attached panels hingeably attached to each other along inner sides of the first pair of hingeably attached panels, an outer side of one of the panels of the first pair of hingeably attached panels hingeably attached to one of the support members, an outer side of the other of the panels of the first pair of hingeably attached panels hingeably attached to a first vertical side of the expandable wall section,
   a second pair of hingeably attached panels hingeably attached to each other along inner sides of the second pair of hingeably attached panels, an outer side of one of the panels of the second pair of hingeably attached panels hingeably attached to a different one of the support members than the support member to which the first pair of hingeably attached panels is hingeably attached to, an outer side of the other of the panels of the second pair of hingeably attached panels hingeably attached to a second vertical side of the expandable wall section, and wherein:
   the panels of the first and second pair of hingeably attached panels assume a face to face orientation with the respective panel of the same pair when the expandable wall section is in the compact position; and
   the panels of the first and second pair of hingeably attached panels assume a side by side orientation with the respective panel of the same pair when the expandable wall section is in the expanded position.

20. An expandable trailer as defined in claim 19, wherein the fixed floor, fixed roof, fixed floor and the plurality of support members are part of a fixed frame of the expandable trailer, further comprising:
   at least two side actuators hingeably coupled to the fixed frame of the expandable trailer, each of the side actuators further hingeably coupled to a different one of the first and second pairs of hingeably attached panels, each side actuator expanding or contracting to move the pair of hingeably attached panels to which the side actuator is coupled to between the face to face and side by side orientations.

* * * * *